(12) United States Patent  (10) Patent No.: US 9,314,855 B2
Ookubo et al.  (45) Date of Patent: Apr. 19, 2016

(54) ELECTRIC BORING TOOL (75) Inventors: Takahiro Ookubo, Hitachinaka (JP); Kazutaka Iwata, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 1009 days.

(21) Appl. No.: 13/147,492

(22) PCT Filed: Feb. 1, 2010

(86) PCT No.: PCT/JP2010/000581
§ 371 (c)(1),
(2), (4) Date: Aug. 2, 2011

(87) PCT Pub. No.: WO2010/087206
PCT Pub. Date: Aug. 5, 2010

(65) Prior Publication Data
US 2011/0284255 A1    Nov. 24, 2011

(30) Foreign Application Priority Data

Feb. 2, 2009   (JP) .................................. 2009-021661

(51) Int. Cl.
*B25D 11/00*    (2006.01)
*H02P 7/00*     (2006.01)
(Continued)

(52) U.S. Cl.
CPC .............. *B23B 45/02* (2013.01); *B25D 16/006* (2013.01); *H02P 6/06* (2013.01); *H02P 23/03* (2013.01);
(Continued)

(58) Field of Classification Search
CPC ........... B25F 5/00; B25B 21/00; B25B 23/14; B25D 2250/205; B25D 2250/201; H02P 6/002; H02P 6/20; H02P 1/18; H02P 8/04; H02P 8/12

USPC ................... 173/1–11, 176–183; 227/1–7
See application file for complete search history.

(56) References Cited

U.S. PATENT DOCUMENTS 5,014,793 A  *  5/1991  Germanton et al. .......... 173/181
5,563,482 A  *  10/1996 Shaw et al. ................... 318/272
(Continued)

FOREIGN PATENT DOCUMENTS

DE   10 2006 056 833 A1   6/2008
EP       0 808 018 A1    11/1997
(Continued)

OTHER PUBLICATIONS

Chinese Office Action, w/ English translation thereof, issued in Chinese Patent Application No. CN 201080006253.X dated Aug. 19, 2013.
(Continued)

*Primary Examiner* — Andrew M Tecco
(74) *Attorney, Agent, or Firm* — McDermott Will & Emery LLP (57)  ABSTRACT

An electric boring tool comprises an electric motor, a switch trigger, a tip tool driven by driving force of the electric motor, a power transmission mechanism for transmitting the driving force of the electric motor to the tip tool as rotational force and/or hammer force, and a motor control unit for controlling speed of the electric motor in response to an extent of pulling of the switch trigger. The motor control unit subjects the electric motor to low speed control after the electric motor is started up, and controls the speed of the electric motor in response to the extent of pulling of the switch trigger when the load current of the electric motor is set value or greater during the low speed control.

8 Claims, 9 Drawing Sheets

(51) Int. Cl.
  *B25F 5/00* (2006.01)
  *B23B 45/02* (2006.01)
  *B25D 16/00* (2006.01)
  *H02P 6/06* (2006.01)
  *H02P 23/03* (2006.01)
  *H02P 27/08* (2006.01)

(52) U.S. Cl.
  CPC .......... *H02P 27/08* (2013.01); *B25D 2211/061* (2013.01); *B25D 2222/72* (2013.01); *B25D 2250/055* (2013.01); *B25D 2250/095* (2013.01); *B25D 2250/201* (2013.01); *B25D 2250/221* (2013.01); *B25D 2250/255* (2013.01); *Y02P 70/173* (2015.11)

(56) References Cited

U.S. PATENT DOCUMENTS

| | | | |
|---|---|---|---|
| 5,572,916 A * | 11/1996 | Takano | 83/74 |
| 6,296,065 B1 * | 10/2001 | Carrier | 173/217 |
| 6,460,626 B2 * | 10/2002 | Carrier | 173/1 |
| 6,536,536 B1 * | 3/2003 | Gass et al. | 173/2 |
| 6,873,124 B2 * | 3/2005 | Kawano et al. | 318/244 |
| 7,109,675 B2 * | 9/2006 | Matsunaga et al. | 318/433 |
| 7,174,973 B1 * | 2/2007 | Lysaght | 173/217 |
| 7,199,539 B2 * | 4/2007 | Chang | 318/400.21 |
| 7,235,940 B2 * | 6/2007 | Bosch et al. | 318/432 |
| 7,320,368 B2 * | 1/2008 | Watanabe | 173/48 |
| 7,681,659 B2 * | 3/2010 | Zhang et al. | 173/1 |
| 7,882,899 B2 * | 2/2011 | Borinato et al. | 173/176 |
| 7,882,900 B2 * | 2/2011 | Borinato et al. | 173/176 |
| 8,022,654 B2 * | 9/2011 | Zhao et al. | 318/526 |
| 2001/0024601 A1 * | 9/2001 | Miescher et al. | 408/199 |
| 2004/0119431 A1 * | 6/2004 | Kawano et al. | 318/268 |
| 2006/0145640 A1 * | 7/2006 | Chang | 318/254 |
| 2006/0208577 A1 * | 9/2006 | Richter et al. | 307/326 |
| 2006/0254785 A1 * | 11/2006 | Watanabe | 173/48 |
| 2009/0071671 A1 * | 3/2009 | Zhong et al. | 173/176 |
| 2009/0206783 A1 * | 8/2009 | Zhao et al. | 318/430 |

FOREIGN PATENT DOCUMENTS

| | | |
|---|---|---|
| EP | 1 136 191 A2 | 9/2001 |
| EP | 2 127 824 A2 | 12/2009 |
| JP | 01-291686 | 11/1989 |
| JP | 05-176574 | 7/1993 |
| JP | 11-164579 A | 6/1999 |
| JP | 330553 B2 | 4/2002 |
| JP | 2004-194422 | 7/2004 |
| JP | 2004-255542 A | 9/2004 |
| JP | 2006-315162 A | 11/2006 |
| JP | 2007-125650 | 5/2007 |
| JP | 2008-178935 A | 8/2008 |
| JP | 2008-278633 A | 11/2008 |
| WO | WO 2009/107563 A2 | 9/2009 |

OTHER PUBLICATIONS

Japanese Office Action issued in Japanese Patent Application No. JP 2009-021661 dated Mar. 21, 2013, with English Translation.

* cited by examiner

ELECTRIC BORING TOOL

This application is the U.S. National Phase under 35 U.S.C. §371 of International Application No. PCT/JP2010/000581, filed on Feb. 1, 2010, which in turn claims the benefit of Japanese Application No. 2009-021661, filed on Feb. 2, 2009, the disclosures of which Application are incorporated by reference herein.

TECHNICAL FIELD

The present invention relates to an electric boring tool such as a hammer drill that drives a bit using an electric motor.

BACKGROUND ART

An electric boring tool such as a hammer drill driven by an electric motor is used for forming holes in work material (work) such as concrete and brick by providing rotational force, hammer force or both to a tip tool such as a drill bit using an electric motor. Such an electric boring tool is also used for an operation to trim such a hole. However, there is a problem where it is easy for damage to occur in the vicinity of an opening for a hole when creating a hole in brittle work such as concrete or brick.

In view of this, patent literature 1 discloses a technique wherein an applied voltage proportional to an extent of pulling (extent of operation) of a switch trigger of an electric boring tool is taken as a control signal to rise as the extent of pulling of the trigger rises. This then results in motor speed being made to increase in proportion to the extent of pulling of the trigger. With this kind of control, the speed of the motor is prevented from increasing abruptly by the operator keeping the extent of pulling of the switch trigger small when starting operation so as to maintain a low speed. This means that positioning of the tip tool or working by the tip tool with respect to the work becomes easier for operations such as making holes or cutting and damage to the work is prevented.

CITATION LIST

Patent Literature

[PTL 1]
Unexamined Japanese Patent Application KOKAI Publication No. 2004-194422

SUMMARY OF INVENTION

Technical Problem

In a motor control method using the switch trigger of the related art, as the extent of pulling the switch trigger increases, motor speed sharply increases in proportion to the extent of pulling. An operator using the electric boring tool therefore has to hold the switch trigger so that the extent by which the trigger is pulled back is small and perform a delicate trigger operation that maintains the motor speed in the desired low speed region.

However, in reality, it is difficult for the operator to keep the extent by which the trigger is pulled back small. This means that a rotary operation of the electric motor will become unstable due to fluctuations in the extent by which the trigger is delicately pulled depending on the work material. This means that the tip tool of the electric boring tool can no longer be accurately positioned at prescribed locations on the work and cases where the work becomes damaged occur.

It is therefore an object of the present invention to provide an electric boring tool that controls a rotational speed of the electric motor to be a low speed during the starting of operation.

A description of exemplary features of the invention disclosed in this document for achieving the objects of the present invention is as follows.

Solution to Problem

An electric boring tool according to a first aspect of the present application comprises an electric motor; a switch trigger; a tip tool driven by driving force of the electric motor, a power transmission mechanism for transmitting the driving force of the electric motor to the tip tool as rotational force and/or hammer force; and a motor control unit for controlling speed of the electric motor in response to an extent of pulling of the switch trigger. The motor control unit subjects the electric motor to low speed control after the electric motor is started up, and controls the speed of the electric motor in response to the extent of pulling of the switch trigger when the load current of the electric motor is set value or greater during the low speed control.

The motor control unit may comprise a setting unit capable of arbitrarily setting the set values for the motor load current.

The power transmission mechanism may be a hammer drill mechanism having a switching mechanism for selecting one operation mode of at least a "rotary-hammer mode" or a "hammer mode" for transmission to the tip tool.

The motor control unit may comprise a soft release unit for releasing the automatic control for the low speed rotation.

An electric boring tool according to a second aspect of the present invention comprises an electric motor; a switch trigger; a tip tool driven by driving force of the electric motor, a power transmission mechanism for transmitting the driving force of the electric motor to the tip tool as rotational force and/or hammer force; and a motor control unit for controlling speed of the electric motor in response to an extent of pulling of the switch trigger. The motor control unit subjects the electric motor to low speed control after the electric motor is started up, and controls the speed of the electric motor in response to the extent of pulling of the switch trigger when vibration or stress generated in the electric boring tool are set values or greater during the low speed control.

The motor control unit may comprise a setting unit capable of arbitrarily setting the set values for vibration and stress.

The power transmission mechanism may be a hammer drill mechanism having a switching mechanism for selecting one operation mode of at least a "rotary-hammer mode", or a "hammer mode" for transmission to the tip tool.

The motor control unit may comprise a soft release unit for releasing the automatic control for the low speed rotation.

The electric motor may comprise a brushless motor and the motor control unit may control the speed of the electric motor by pulse-width-modulating a voltage applied to the electric motor in response to the extent of pulling of the switch trigger.

Advantageous Effects of Invention

According to the electric boring tool according to the first aspect of the present invention, the motor control unit is capable of automatically exerting control to give low speed rotation (low-speed control) of the electric motor unless load current of the electric motor reaches or exceeds set value after start of operation of the tip tool is detected. It is therefore possible to prevent or ease damage such as splitting and cracking due to drilling while making a hole in work (a workpiece) such as concrete or brick.

According to the electric boring tool according to the second aspect of the present invention, automatic control at low speed rotation for the electric motor takes place so that vibration or stress occurring at the power transmission mechanism do not reach or exceed set values. The speed of the electric motor is then controlled in response to the extent of pulling of the switch trigger when the vibration or stress occurring in the electric boring tool during automatic control at low speed rotation increase to reach or exceed the set values. It is therefore possible to prevent or ease damage such as splitting and cracking due to drilling while making a hole in work (a workpiece) such as concrete or brick.

DESCRIPTION OF EMBODIMENTS

The above and further objects of the present invention together with the above and further novel features of the present invention will now become clear from the disclosure following in this specification and the appended drawings.

Embodiments of the present invention are explained in the following based on the drawings. In all of the drawings illustrating the embodiments, portions or elements having the same functions are given the same numerals and are not repeatedly described.

(First Embodiment)

Figure 1:
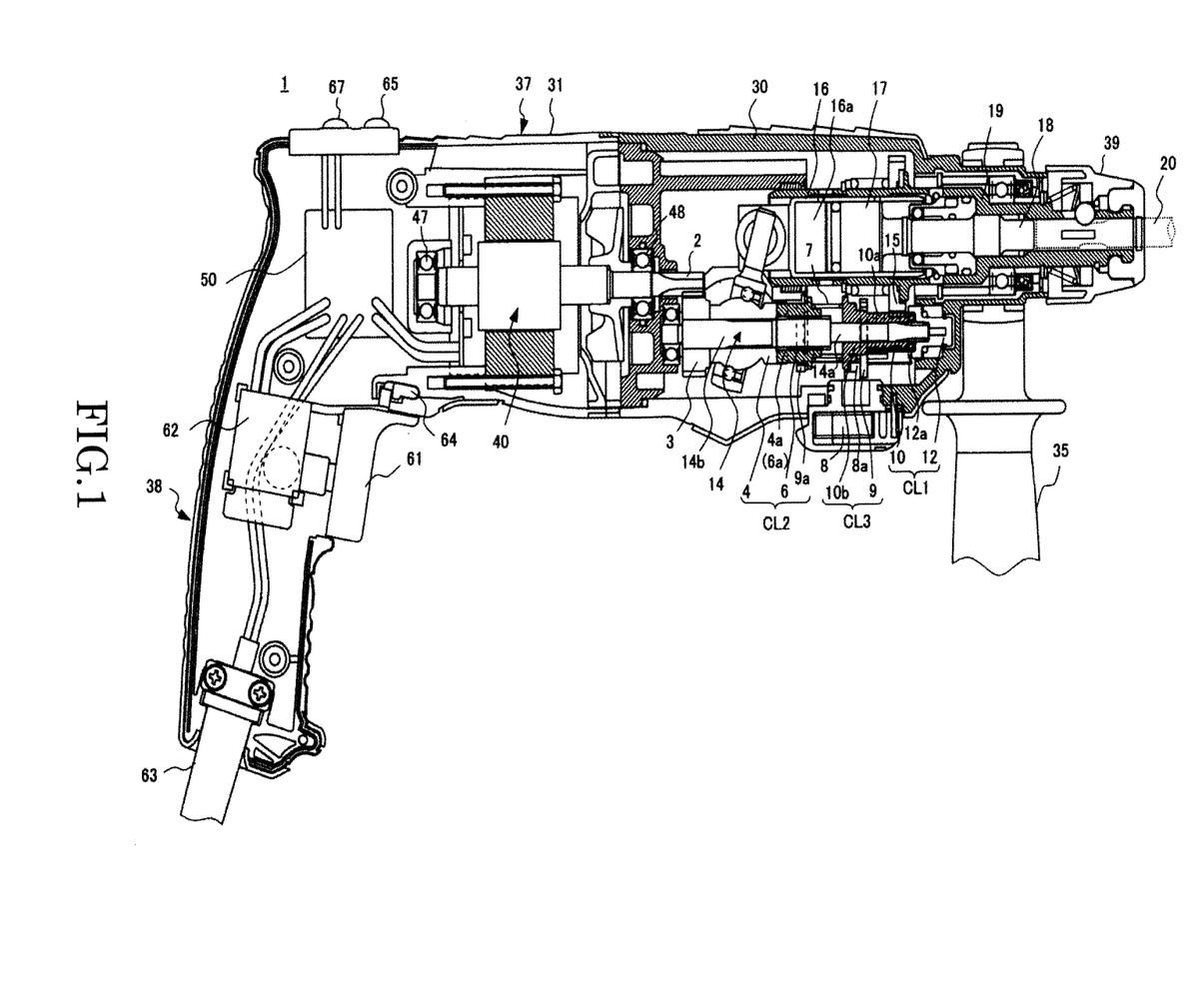
FIG. 1 is an overall structural view of an electric boring tool of a first embodiment of the present invention.
Figure 2:
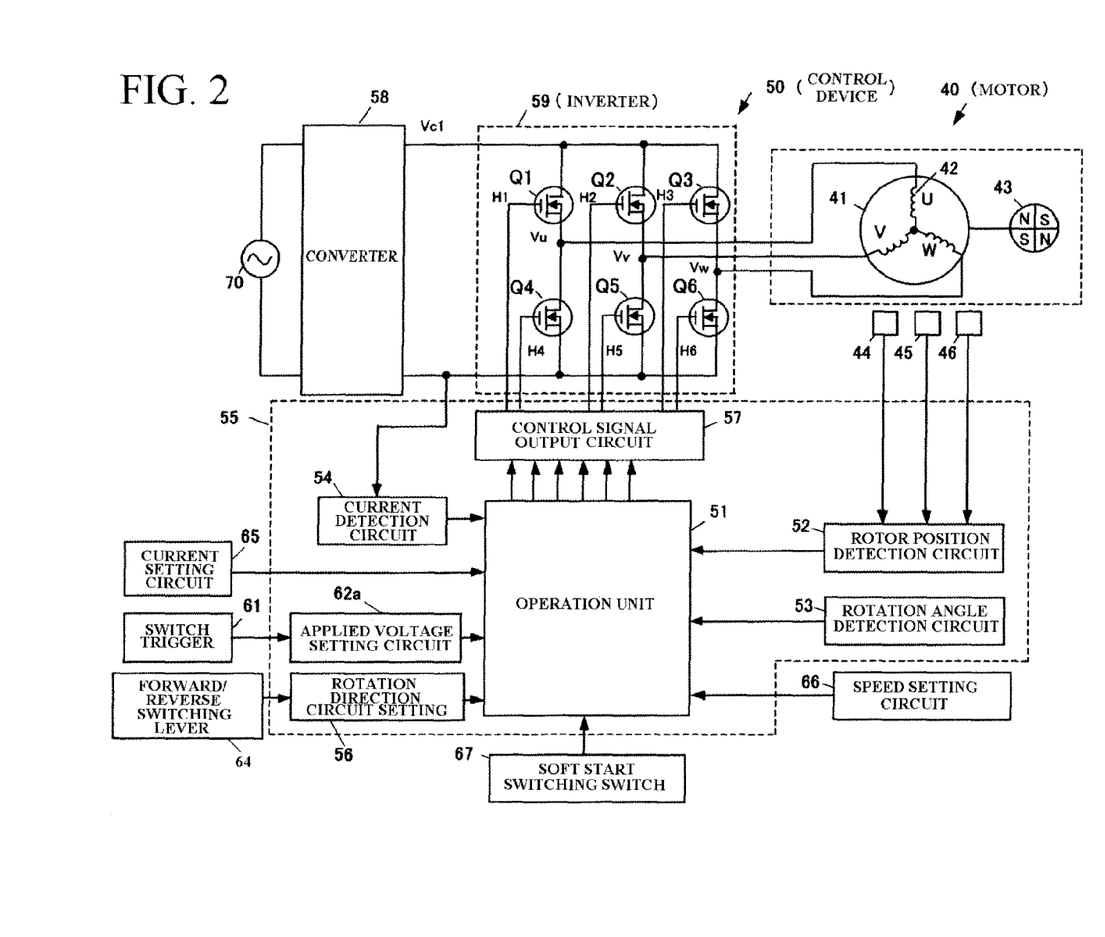
FIG. 2 is a block diagram of the electric boring tool illustrated in FIG. 1.
Figure 3:
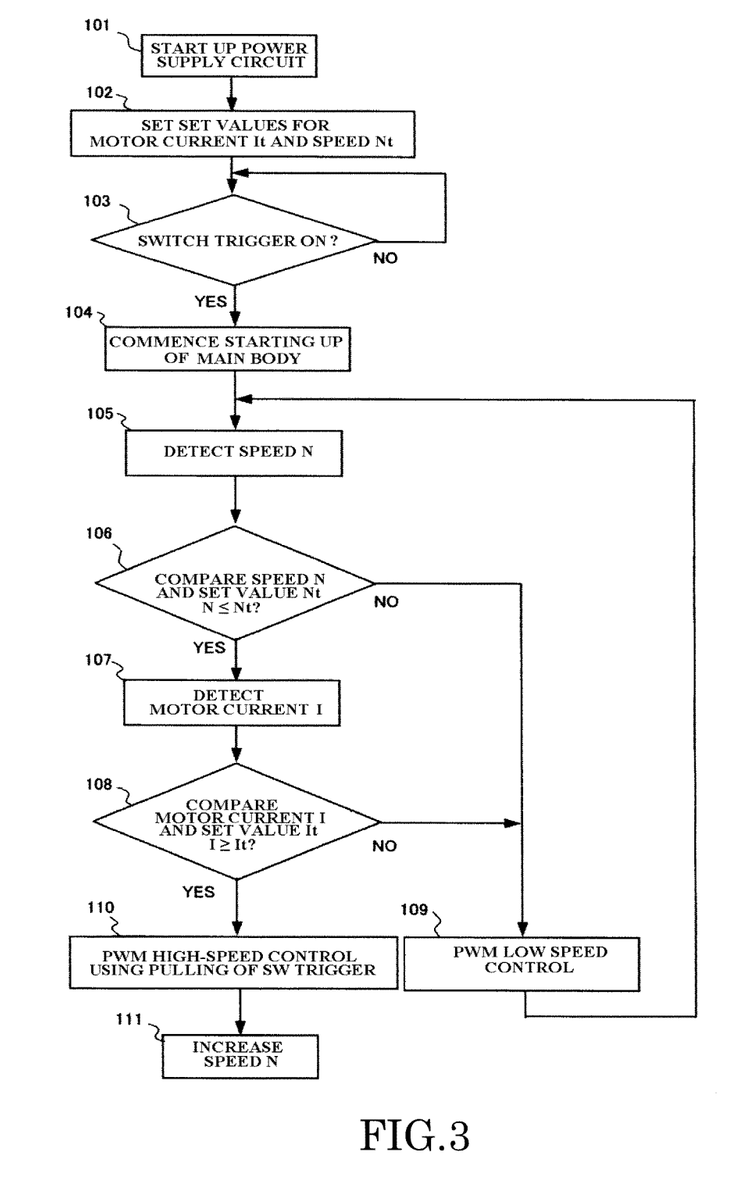
FIG. 3 a flowchart of control for the electric boring tool illustrated in FIG. 2.

FIG. 1 is an overall structural view showing the electric boring tool of a first embodiment of the present invention applied to a hammer drill, FIG. 2 is a block diagram of a control device when an electric motor that drives the hammer drill is a brushless motor, and FIG. 3 shows a flowchart of control of the control device for the hammer drill illustrated in FIG. 2.

(Overall Configuration of the Hammer Drill)

First, an explanation is given of the overall configuration of a hammer drill of the first embodiment of the present invention with reference to FIG. 1 and FIG. 2.

As illustrated in FIG. 1, a hammer drill 1 includes a tool body comprised of a body housing 37 extending from one end (left end in the drawing) to the other end (right end in the drawing) along the same direction (horizontal axial direction) as an axis of rotation of the brushless motor (DC motor) 40, and a handle housing 38 descending vertically from the body housing 37. A tip tool 20 such as a drill bit that incurs rotational force and/or hammer force from the tool body and bores holes in work 90 (refer to FIG. 6) is detachably fitted at a tip tool holding unit (chuck) 39 arranged at the other end of the body housing 37. A switching member 8 for switching over the operating mode is provided at a side of the other end of the body housing 37. As described after, a projecting section 8a of the switching member 8 moves so that it is possible to alternately select various operation modes of "rotary-hammer mode", "rotary mode", "hammer mode", and "neutral mode" by rotating the switching member 8. A side handle 35 enabling the operator to reliably hold the tool body is provided in the vicinity of the tip tool holding unit 39.

A power supply cable 63 for supplying a commercial AC power, a switch trigger 61, and a switch mechanism 62 having a switch for causing the control device 50 to start supplying the power in response to an extent of pulling of the trigger of the switch trigger 61 and having an applied voltage setting circuit 62a (refer to FIG. 2) for converting the extent of pulling the trigger of the switch trigger 61 to an electrical quantity (voltage) are fitted to the handle housing 38. The control device (circuit substrate) 50 for controlling rotational speed of the brushless motor 40 is provided at one end of the body housing 37.

(Configuration of a Power Transmission Mechanism)

The body housing 37 includes a motor casing 31. The brushless motor 40 is supported by bearings 47 and 48 at the motor casing 31. The brushless motor 40 has a pinion output shaft 2 that outputs rotational drive force within a gear casing 30 coupled to the motor casing 31. Rotational drive force from the pinion output shaft 2 is transmitted to a rear half 14b of an intermediate shaft 14 from the pinion output shaft 2 via a gear 3. A motion conversion member 4 that is fitted with play so as to be rotatable with respect to an intermediate shaft 14 and that converts rotational force to hammer force is provided at the rear half 14b of the intermediate shaft 14. When the motion conversion member 4 engages with the intermediate shaft 14b due to the later-described second clutch mechanism CL2, hammer force converted by the motion conversion member 4 is transmitted to a hammering transmission mechanism for transmitting to the tip tool 20 held at the tip tool holding unit 39. The intermediate shaft 14 itself constitutes a rotation transmission mechanism for transmitting rotational force to the tip tool 20 together with the first clutch mechanism CL1 engaging with the front half 14a of the intermediate shaft 14.

Describing in more detail, a second gear 15 is provided at a cylinder 19 holding the tip tool 20. A second pinion 10 is then attached to the front half 14a of the intermediate shaft 14 so as to correspond to the second gear 15 so as to be rotatable with respect to the intermediate shaft 14a and the movable in an axial direction of the intermediate shaft 14a.

A pinion sleeve 12 having a gear 12a capable of engaging with a pinion section 10a of the second pinion 10 is press-fitted at the intermediate shaft 14a on the side of the tip tool 20 of the second pinion 10. The intermediate shaft 14 is a construction that can be split into two parts of the intermediate shaft 14a positioned at the right side of the drawing and the intermediate shaft 14b position that the left side of the drawing. The intermediate shaft front half 14a is connected by press fitting to the intermediate shaft rear half 14b so as to rotate integrally.

The pinion section 10a of the second pinion 10 and the gear 12a of the pinion sleeve 12 are configured so as to engage with each other. When the pinion section 10a and the gear 12a engage, the rotary motion of the intermediate shaft 14a is transmitted to the second pinion 10 via the pinion sleeve 12 and is transmitted to the cylinder 19 via the second gear 15 so as to cause the tip tool 20 to rotate.

When the operation mode is switched over using the switching member (change lever) 8, the operator moves the projecting section 8a of the switching member 8 as a result of mode switching of the switching member 8 and moves a rotation engaging member 9 to the side (left side) of the brushless motor 40. If the rotation engaging member 9 is moved to the side (left side) of the brushless motor 40, the second pinion 10 moves to the side of the brushless motor 40. Engagement with the pinion sleeve 12 is therefore released, the intermediate shaft 14 idles at the inner diameter section of the second pinion 10, and the transmission of rotational force to the cylinder 19 is ceased. This is to say that the pinion sleeve 12 and the second pinion 10 constitute a first clutch mechanism CL1 where rotational force is transmitted or not transmitted using the switching member 8.

For example, the position of the projecting section 8a of the switching member 8 and the position of the rotation engaging member 9 illustrated in FIG. 1 shows the case of "rotary-hammer mode" where the second pinion 10 spline-engages with the pinion sleeve 12 due to the first urging spring 7 and rotational force is transmitted to the cylinder 19 from the intermediate shaft 14a via the second gear 15.

On the other hand, a sleeve 6 is provided on the intermediate shaft 14b so as to be capable of moving in an axial direction of the intermediate shaft 14b and is coupled so as to spline-fit with the intermediate shaft 14b so that rotation is not possible. The motion conversion member 4 is fitted to the intermediate shaft 14b with play so as to be capable of rotating with respect to the intermediate shaft 14b and not capable of moving in the axial direction of the intermediate shaft 14b. Pawl sections capable of enabling mutual engagement are provided at the sleeve 6 and the motion conversion member 4. While a pawl section 6a of the sleeve 6 engages with the pawl section 4a of the motion conversion member 4, the rotation motion of the intermediate shaft 14b is transmitted to the motion conversion member 4 via the sleeve 6, converted to a hammering motion by the reciprocating action of the motion conversion member 4, and hammer force is transmitted to the tip tool 20.

A collar element 9a of the rotation engaging member 9 is then moved to the side of the tip tool 20 by the switching member 8. As a result, if the sleeve 6 moves to the side of the tip tool 20, it is possible for engagement of the pawls (4a, 6a) of the sleeve 6 and the motion conversion member 4 to be released, and for transmission of a hammering motion to the tip tool 20 to be ceased. A second clutch mechanism CL2 that controls the transmission of hammering to the tip tool 20 is therefore configured by the sleeve 6 and the motion conversion member 4.

A first urging spring 7 (urging unit) for continually urging the second pinion 10 and the sleeve 6 in a direction of coupling of the first clutch mechanism CL1 and the second clutch mechanism CL2 is provided between the second pinion 10 and the sleeve 6 on the intermediate shaft 14.

The switching member 8 has the projecting section 8a positioned eccentricity from a central axis provided so as to be rotatable and operable from outside of the housing. The projecting section 8a moves the second pinion 10 to the side of the brushless motor 40 via the rotation engaging member 9 when the switching member 8 is rotated to move towards to the side of the brushless motor 40. As a result, the switching member 8 disengages the second pinion 10 and the pinion sleeve 12 and functions as a means for disengaging the first clutch CL1.

As illustrated in FIG. 1, the rotation engaging member 9 is provided in the vicinity of the second pinion 10. Although details of the structure are not illustrated in the drawings, the rotation engaging member 9 is capable of moving in an axial direction of the intermediate shaft 14 and has a through-hole (not illustrated) capable of enabling engagement with an outer peripheral section of a gear 10b of the collar element at the second pinion 10. While the rotation starting member 9 moves to the side of the brushless motor 40 due to the switching member 8, the rotation engaging member 9 restricts rotation of the second pinion 10 through engagement of the gear 10b and the through-hole and restricts rotation of the cylinder 19 and the tip tool 20. The rotation engaging member 9 is always urged in the direction of engagement with the second pinion 10 by a second urging spring (not illustrated) used as urging unit. The rotation engaging member 9 constitutes a third clutch mechanism CL3 that restricts rotation of the tip tool 20 together with the second pinion 10.

The collar element 9a formed integrally with the rotation engaging member 9 is means for causing the sleeve 6 to move in a direction of disengagement from the motion conversion member 4. The collar element 9a moves in conjunction with rotation of the switching member 8 via the projecting section 8a and the rotation engaging member 9 so as to move in an axial direction of the intermediate shaft 14 and is a means capable of moving the sleeve 6 in a direction of disengagement from the motion conversion member 4 while the rotation engaging member 9 and the second pinion 10 are disengaged, i.e. in a state where the first clutch mechanism CL1 is disengaged.

A piston 16 is subject to a reciprocating motion due to the motion conversion member 4 when the pawl section 4a of the motion conversion member 4 is engaged with the pawl section 6a of the sleeve 6 by the second clutch mechanism CL2. On the other hand, the air chamber 16a is defined between the piston 16 and a striker 17. The air chamber 16a defined between the piston 16 and the striker 17 then functions as an air spring that repeatedly compresses and expands as a result of the reciprocating motion of the piston 16. As a result, by using the air spring of the air chamber 16a, the piston 16 transmits hammer force to the tip tool 20 via the striker 17 and an intermediate element 18.

(Configuration of the Control Device 50)

As illustrated in the circuit block diagram of FIG. 2, the control device 50 for controlling the brushless motor 40 is equipped with a control unit 55, a converter 58, and an inverter 59. The control device 50 controls the number of rotation of the brushless motor 40 in accordance with the load carried by the brushless motor 40.

In this embodiment, a brushless motor 40 is used as the drive motor. Compared to a motor with a brush, a brushless motor 40 is capable of controlling speeds over a broad range from low speed rotation to high-speed rotation by controlling voltages supplied to a motor by using PWM control in order to control motor speed. It is therefore possible to improve work material boring efficiency.

In this embodiment, the brushless motor 40 is constituted by a three-phase brushless DC motor. The brushless motor 40 is an inner rotor-type motor. The brushless motor 40 comprises a rotor (magnet rotor) 43 embedded with two pairs of permanent magnets with north and south poles, three rotation position detecting elements (Hall sensor ICs) 44, 45, 46 arranged every sixty degrees for detecting the rotational position of the magnet rotor 43, and a stator winding 42 including star-connected three-phase windings U, V and W of a stator 41, whose excitation sections of electrical angles of onehundred and twenty degrees is controlled based on position detection signals of the hall sensor ICs 44, 45, and 46.

It is also possible to adopt a sensorless method that detects a rotor position by extracting an induced voltage (counter electromotive force) of the stator winding 42 as a logic signal via a filter in place of using Hall sensor IC's as the rotation position detection elements (44, 45, 46) of the rotor 43 of the brushless motor 40.

The converter 58 converts a commercial AC power supplied from a commercial AC power supply 70 to a direct current (DC) power and applies a DC voltage Vc1 to the inverter 59. The inverter 59 is constituted by six MOSFETs (insulating gate type field-effect transistors) Q1 to Q6 connected in the form a three-phase bridge. Each of the gates of the six bridge-connected MOSFETs Q1 to Q6 are connected to the control signal output circuit (inverter driver circuit) 57. The drains or sources of the six MOSFETs Q1 to Q6 are then connected to the star-connected three-phase windings U, V and W of the stator winding 42. As a result, the six MOSFETs Q1 to Q6 are switched by drive signals H1 to H6 inputted by the control signal output circuit 57. A DC voltage Vc1 applied to the inverter 59 is supplied as power to each winding U, V, W of the stator winding 42 as three-phase (U-phase, V-phase, W-phase) voltages Vu, Vv, and Vw.

The control unit 55 supplies pulse width modulated signals (PWM signals) H4, H5, and H6 of the drive signals (three-phase signals) that drive each gate of the six MOSFETs Q1 to Q6 to the three MOSFETs Q4, Q5, and Q6 on the negative side of the power supply. A voltage applied to the stator winding 42 is therefore subjected to PWM control so as to control the speed of the rotor 43 of the brushless motor 40. Electrical power supplied to the stator winding 42 is then adjusted by changing the pulse width (duty ratio) of PWM drive signals supplied to the gates of the three MOSFETs Q4, Q5, and Q6 on the negative power supply side by the control unit 55 thereby controlling the speed of the brushless motor 40. The PWM drive signals are supplied to a switching element group of either one side of the positive power supply side MOSFETs Q1 to Q3 or the negative power supply side MOSFETs Q4 to Q6 of the inverter 59. Electrical power supplied to each of the windings U, V, and W of the stator winding 42 by DC voltages from the converter 58 can then be effectively adjusted through high-speed switching of the switching elements so as to control the speed of the motor 40.

Although not illustrated in the drawings, the control unit 55 includes an operation unit (microcomputer) 51 including a CPU for outputting drive signals based on a processing program and data, a ROM for storing the processing program and control data, RAM for temporarily storing data, and a timer etc. The control unit 55 comprises a control signal output circuit 57 for supplying PWM drive signals generated by the operation unit 51 to the inverter 59, the applied voltage setting circuit 62*a* for outputting a control voltage for setting a duty ratio PD in response to an extent of pulling (trigger pulling amount) d of the switch trigger 61 in order to set duty ratios for the output PWM drive signals of the control signal output circuit 57, a rotation direction setting circuit 56 for detecting a forward direction rotation or reverse direction rotation operation using a forward/reverse switching lever 64 of the brushless motor 40 and setting the rotation direction of the brushless motor 40, and a rotor position detection circuit 52 and a rotation angle detection circuit 53 for detecting the relative position of the rotor 43 and the stator winding 42 (U, V, W) based on the output signals of the three rotation position detection elements 44, 45, and 46.

Figure 4:
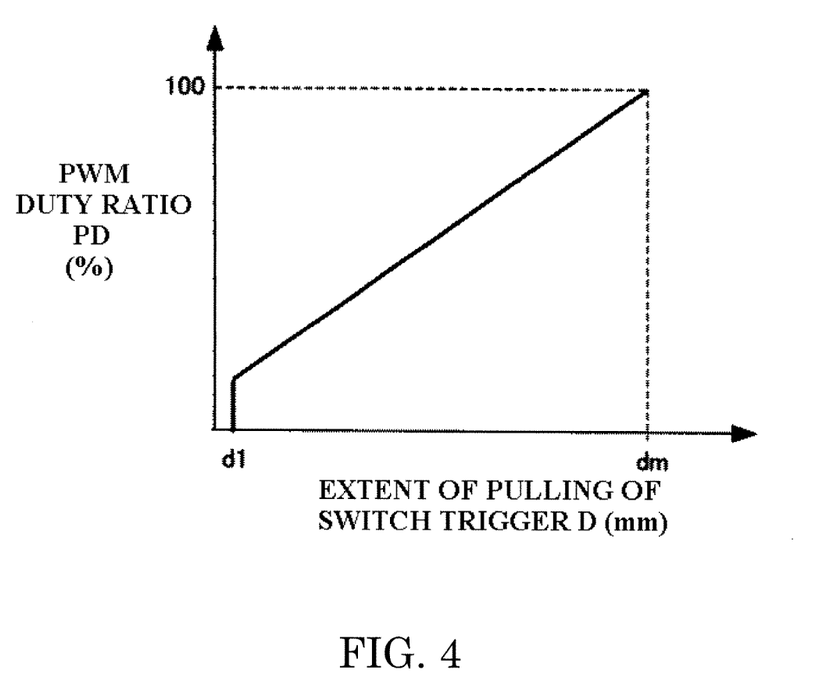
FIG. 4 is a diagram of the relationship of extent of pulling of a switch trigger of an electric boring tool illustrated in FIG. 1 versus PWM duty ratio.

In the usual event of speed control using the extent of pulling of the trigger of the switch trigger 61, as illustrated in FIG. 4, the operation unit 51 outputs a PWM duty ratio PD for the PWM drive signals (H4, H5, H6) based on a setting voltage received from the applied voltage setting circuit 62*a* in response to the extent of pulling the trigger d of the switch trigger 61.

When a soft start switching switch (soft release switch) 67 is on, the operation unit 51 controls the speed of the brushless motor 40 to be a low speed equal to or lower than a prescribed speed or performs constant speed control to a low speed equal to or lower than the prescribed speed. In the following, in the present invention, low speed control (low rotational speed control) of equal to or less than a prescribed speed or constant speed control of equal to or less than a prescribed speed when the soft release switch 67 is on is referred to as "low speed control". According to this embodiment described below, in order to achieve low speed control, the operation unit 51 determines whether or not the speed (N) of the brushless motor 40 is equal to or less than a set value (Nt) based on detection outputs of the rotor position detection circuit 52 and the rotation angle detection circuit 53 and performs constant speed control to put the duty ratio of the PWM drive signal for the control signal output circuit 57 to a low rotational speed so that the speed (N) of the brushless motor 40 becomes the prescribed speed based on this determination output. It is also possible for low speed control at the operation unit 51 to be carried out so as to exert control so that the speed (N) of the brushless motor 40 becomes equal to or less than the prescribed speed (Nt) for low rotational speed by fixing the duty ratio of the PWM drive signal of the control signal output circuit 57 to a low value.

A current detection circuit 54 detects current flowing in the stator winding 42 via the switching elements Q1 to Q6 in order to detect the load current (I) of the brushless motor 40. The operation unit 51 then compares the detected current (I) of the current detection circuit 54 with a set signal (It) of a load current setting circuit 65 and controls the duty ratios of the drive PWM signals (H1 to H6) based on the results of this comparison. In this event, the operation unit 51 controls the duty ratio of the PWM drive signals H1 to H6 outputted to the control signal output circuit 57 regardless of the extent of pulling of the trigger of the switch trigger 61 so as to subject the motor speed (N) to low speed control to a low speed Nt or less when the detected signal (I) of the current detection circuit 54 is smaller than the set signal (It) of the load current setting circuit 65 in the event that the soft start switching switch 67 is on.

Conversely, the operation unit 51 controls the duty ratio of the PWM drive signals H1 to H6 outputted to the control signal output circuit 57 in response to an output voltage of the applied voltage setting circuit 62*a* corresponding to the extent of pulling the trigger of the switch trigger 61 when a detected current (I) of the current detection circuit 54 is equal to or larger than the set signal (It) of the load current setting circuit 65. When a soft start switching switch 67 is off (when the soft start is released), the operation unit 51 normally operates by the switch trigger 51 and controls so that, as illustrated in FIG. 4, the duty ratio PD of the PWM drive signals H1 to H6 is made large in proportion to the amount of pulling of the trigger d so as to increase the speed of the brushless motor 40.

The operation unit 51 generates PWM drive signals for alternately switching prescribed switching elements Q1 to Q6 based on output signals of the rotor position detection circuit 52 and the rotation angle detection circuit 53 and outputs the PWM drive signals to the inverter 59 via the control signal output circuit 57. Prescribed windings U, V, and W of the stator winding 42 are then alternately excited to rotate the rotor 43 in a set rotation direction. The operation unit 51 controls the duty ratio of the PWM drive signals using the load current setting circuit 65, the current detection circuit 54, and the applied voltage setting circuit 62a. The applied voltage setting circuit 62a of the switch mechanism 62 (refer to FIG. 1) coupled to the switch trigger 61 is configured from, for example, a potentiometer (slidable resistor). A sliding element of the potentiometer moves in unison with the extent of pulling of the switch trigger 61. A voltage detected from a moving terminal of the potentiometer is then used as a control voltage for the duty ratio of the PWM drive signal. In this case, when the speed (N) is greater than the prescribed speed (Nt), or when the motor current (I) is less than the set value (It), the operation unit 51 variably controls the duty ratio of the PWM drive signal so that the speed of the brushless motor 40 becomes a constant rotational speed that is the prescribed low speed or the duty ratio of the PWM drive signal is subjected to fixed control so that the speed of the motor 40 becomes equal to or less than the prescribed low speed, regardless of the extent of pulling of the switch trigger 61. As a result, the brushless motor 40 is subject to the low-speed control.

(Each Mode of Operation)
(Rotary-Hammer Mode)

As illustrated in FIG. 1, rotation of the brushless motor 40 is transmitted to the intermediate shaft 14b (a rear half 14b) from the pinion 2 via the gear 3. The pawl section 6a provided at the sleeve 6 spline-fitting with the intermediate shaft 14b and the pawl section 4a provided at the motion conversion member 4 then engage and the piston 16 is reciprocated. On the other hand, an air chamber 16a is defined between the piston 16 and the striker 17. The air chamber 16a defined between the piston 16 and the striker 17 then functions as an air spring that repeatedly compresses and expands as a result of the reciprocating motion of the piston 16. As a result, an air spring of the air chamber 16a is utilized and hammer force is provided to the tip tool 20 via the striker 17 and an intermediate element 18.

At the same time, as described above, rotation of the business motor 40 is transmitted to the second pinion 10 via the first clutch mechanism CL1. Rotation is then transmitted to the cylinder 19 holding the tip tool 20 via the second gear 15. As a result, it is possible to obtain a "rotary-hammer mode" where rotational force and hammer force are transmitted to the tip tool 20.

(Neutral Mode)

If the switching member 8 is operated from the "rotary-hammer mode" so that the projecting section 8a of the switching member 8 moves to the side of the brushless motor 40, the second pinion 10 is moved to the side of the brushless motor 40 in resistance to urging force of the first urging spring 7 by the projecting section 8a and the first clutch mechanism CL1 is disengaged.

At the same time, the rotation engaging member 9 urged by a second urging spring (not illustrated) collides with the projecting section 8a of the switching member 8 at a position where there is no engagement with the gear 10b of the collar element of the second pinion 10. As a result, transmission of rotation to the tip tool 20 is suspended, the tip tool 20 is in a neutral state, and a blade tip of the tip tool 20 can be of an arbitrary orientation. Namely, a "neutral mode" can be attained.

(Hammer Mode)

When the switching member 8 is operated from the "neutral mode" described above with the blade tip of the tip tool 20 being aligned at a desired orientation and the projecting section 8a of the switching member 8 moves to the side of the brushless motor 40, the projecting section 8a that was formerly abutting against the rotation engaging member 9 urged by the second urging spring (not illustrated) enters an opening (not illustrated) of the rotation engaging member 9. The rotation engaging member 9 then moves to the side of the brushless motor 40 due to the urging force of the second urging spring. The rotation engaging member 9 and the gear 10b of the collar element of the second pinion 10 engage so that the third clutch CL3 is engaged.

It is therefore possible to inhibit idling for the tip tool 20. At this time, the sleeve 6 is being urged by the first urging spring 7. The pawl section 6a of the sleeve 6 and the pawl section 4a of the motion conversion member 4 are then coupled so that the second clutch mechanism CL2 is effectively engaged. Idling of for tip tool 20 is then suppressed by the rotation engaging member 9. The second clutch mechanism CL2 therefore remains engaged because the sleeve 6 is urged by the first urging spring 7. It is therefore possible as a result to implement "hammer mode" where only hammer force is transmitted to the tip tool 20. The internal diameter of the rotation engaging member 9 is larger than the external diameter of the second pinion 10 that engages with the pinion sleeve 12.

(Rotary Mode)

If the switching member 8 is operated by the operator so that the projecting section 8a of the switching member 8 is moved to the side of the tip tool 20 from the state of the "rotary-hammer mode" described above, the rotation engaging member 9 is moved to the side of the tip tool 20 by the projecting section 8a.

At this time, the collar element 9a provided integrally at the rotation engaging member 9 abuts against the sleeve 6. The sleeve 6 therefore also moves to the side of the tip tool 20 together with the rotation engaging member 9 due to the collar element 9a, the second clutch mechanism CL2 is disengaged and the transmission of hammering to the tip tool 20 is ceased. The second pinion 10 is urged by the first urging spring 7. The first clutch mechanism CL1 is therefore engaged so as to give the "rotary mode" where rotational force only is transmitted to the tip tool 20.

Width of this hammer drill 1, in "rotary mode" and "rotary-hammer mode", when it is intended to position the tip tool (bit) 20 such as a hammer drill through pressing against a hole in a work surface 90a (refer to FIG. 6) of the work 90 or a prescribed position in the work surface 90a where it is intended to hammer a hole, the speed of the motor may increase and it becomes easy for the position of the tip tool 20 to slip or it may become impossible for the operator to maintain the hammer drill 1 in the correct posture when working depending on the material of the work 90. According to this embodiment, controlling the speed of the brushless motor 40 is carried out as described below in order to prevent position slipping and to prevent an inappropriate posture being maintained.

(Speed Control of the Brushless Motor 40 by the Control Device 50)

FIG. 3 illustrates the flow for when the control device 50 controls the speed of a brushless motor 40. A description is now given of control of the speed of the brushless motor 40 from low speed rotation to high-speed rotation by the control device 50 with reference to FIGS. 2 and 3.

First, a soft start switching switch 67 is set to on. In step 101, when a power supply switch (not illustrated) is put on, a power supply circuit starts up and power is supplied to a control device 50 etc. Next, a motor load current setting value (threshold value) It and a motor speed setting value (threshold value) Nt are set in order to subject the brushless motor 40 to low speed control performed by the operation unit 51 (step 102). As illustrated in FIG. 2, the motor load current setting value It is set by the current setting circuit 65 and the motor speed setting value Nt is set by a speed setting circuit 66.

Figure 6:
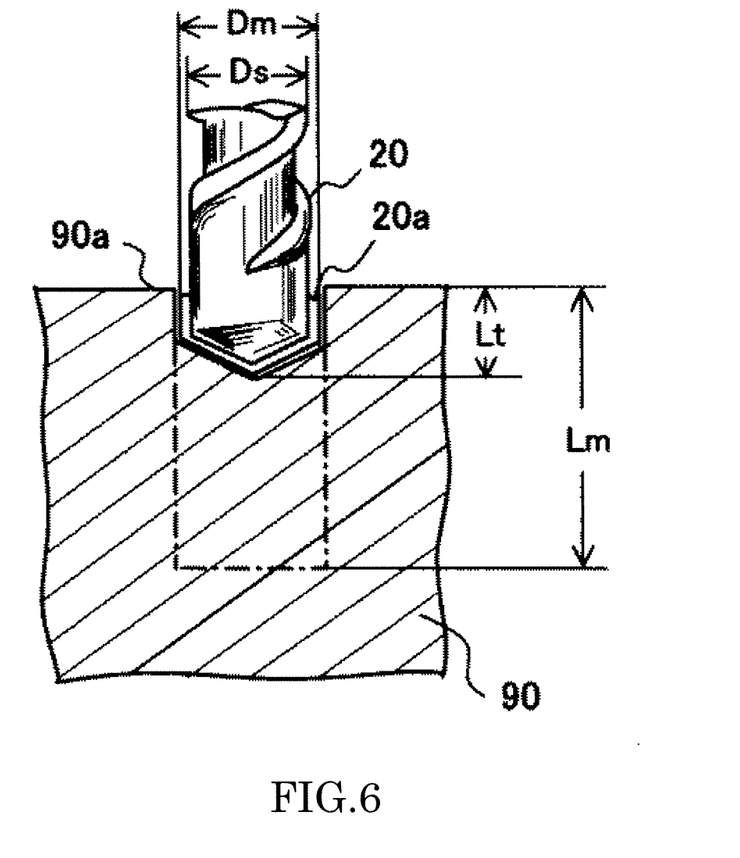
FIG. 6 is a operation state diagram for when a boring operation is carried out using a tip tool of the electric boring tool.

As illustrated, for example, in a diagram of the boring operation by the tip tool 20 in FIG. 6, the setting values (set values) (Nt, It) are decided taking into consideration the prevention of the occurrence of position slipping and cracking or damage to the hole section upon a tip blade 20a of the drill bit 20 boring a hole from the work surface 90a of the work 90 to a prescribed depth Lt or improvement of work efficiency. Namely, control is exerted by the low rotation constant speed control and the torque control so as to prevent cracking or damage occurring at the hole section of the work 90 or make boring of the hole easier.

As illustrated in FIG. 6, typically, the tip blade 20a composed of a super-hard metal material is formed at a tip of the drill bit 20. A maximum external diameter Dm (for example, 12 mm) of this tip blade 20a is formed to be larger than a central external diameter Ds (for example, 10 mm) of the drill bit 20 and has a prescribed overall length Lt (for example, 8 mm). Speed control for low-speed rotation is automatically carried out by the operation unit 51 until a prescribed overall length Lt of the tip blade 20a becomes embedded in the work 90. It is therefore possible to perform boring using weak rotational force or weak boring force. Although not particularly limiting, the boring depth Lt can be calculated (measured) by, for example, building a distance sensor (not illustrated) into the hammer drill 1 and measuring the distance between the hammer drill 1 and the work 90.

As illustrated in FIG. 6, when boring takes place to the prescribed depth Lm after burying the tip blade 20a to a depth of Lt or more, high speed control is carried out by pulling the switch trigger 61. This means that it is difficult for the hole section to become cracked or damaged even if the speed of the drill bit 20 is increased by high-speed control and it is possible to increase the efficiency of the boring operation.

Next, in step 103, operation unit 51 determines whether or not the switch trigger 61 is on. If the switch trigger 61 is on, the hammer drill 1 starts up (step 104).

The operation unit 51 then detects the rotation speed N of the brushless motor 40 based on detection signals of the rotor position detection circuit 52 and the rotation angle detection circuit 53 (step 105) and determines through comparison whether or not the speed N is equal to or slower than the set speed (motor speed setting value) Nt (step 106). When the speed N is greater than the set speed Nt (step 106; No), the operation unit 51 controls the pulse width duty ratio of the PWM drive signal for the control signal output circuit 57 for driving the inverter 59 to be small (step 109), step 105 is returned to, and the speed N is detected again. This control system automatically exerts low speed control via the operation unit (microcomputer) 51.

Next, in step 106, when the speed N is equal to or less than the set speed Nt (step 106; YES), the motor load current I is detected by the operation unit 51 (step 107) and the operation unit 51 determines whether or not the motor load current I is equal to or greater than the set current (motor load current setting value) It (step 108).

When the motor load current I does not reach the set current It in step 108 (NO), step 109 is proceeded to by the operation unit 51, and as in the case above, the operation unit 51 controls the pulse width duty ratio of the PWM drive signal for the control signal output circuit 57 for driving the inverter 59 to be large so as to increase the motor load current I (step 109).

Figure 5:
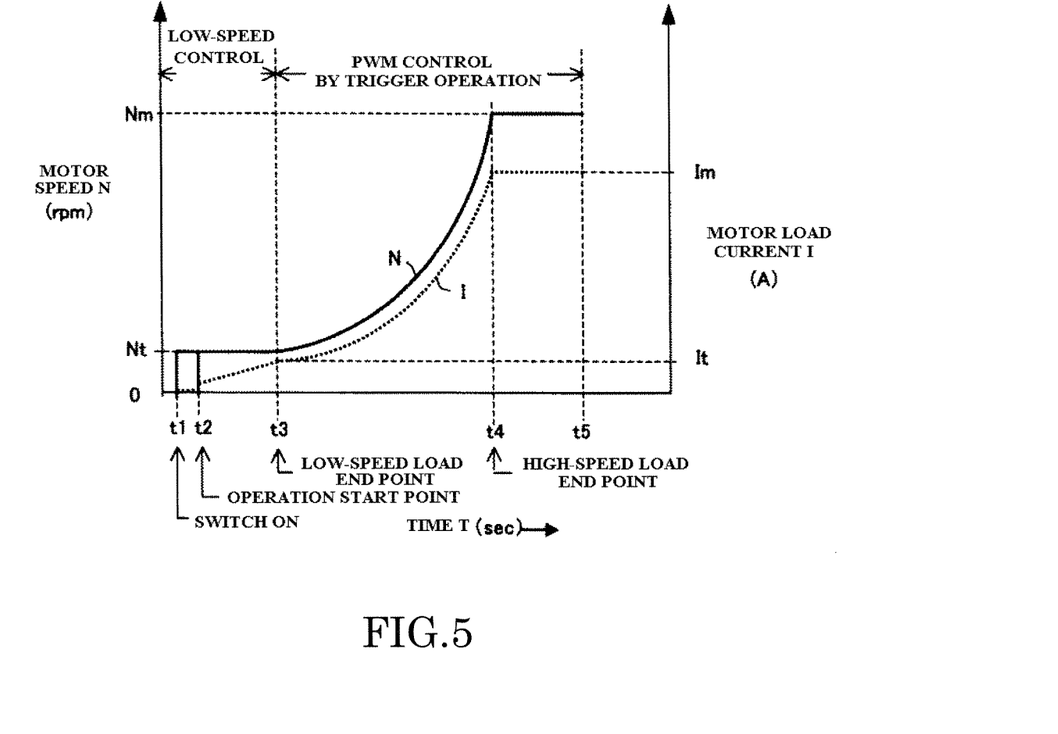
FIG. 5 is a timing chart of when boring is performed using the electric boring tool illustrated in FIG. 2.

The low rotation constant speed control occurring in step 109 can be controlled depending on whether or not the motor speed N and the motor load current I have reached the prescribed set values. It is also possible, as described above, for low speed control at the operation unit 51 to be carried out so as to exert control so that the speed (N) of the brushless motor 40 becomes equal to or less than the prescribed speed (Nt) for a low rotational speed by fixing the duty ratio of the PWM drive signal for the control signal output circuit 57 to a low value. A timing chart illustrated in FIG. 5 shows a situation where constant speed control takes place at low speed rotation from time t2 to time t3. As a result of this low speed control, as illustrated in FIG. 6, a boring operation is possible using a desired motor speed and a desired rotational torque. Shifts in position with respect to the work 90 of the tip tool 20 can be prevented or eased, damage such as chips and splitting or cracking can be prevented or eased, and it is possible to improve boring efficiency.

When the motor load current I is equal to or greater than the set current It in step 108 (YES), as illustrated in FIG. 6, the tip 20a of the drill bit 20 that is the tip tool is determined to have been buried in the section to be bored. When the switch trigger 61 is then gripped tightly by the operator so that the duty ratio of the PWM drive signal of the control signal output circuit 57 is made larger, the operation unit 51 carries out high-speed control (step 110). As a result, as illustrated in FIG. 5, the motor speed N is increased to a maximum speed Nm for the brushless motor 40 determined by the load torque. The motor loaded current I is also increased to a maximum value Im and, as illustrated in FIG. 6, the drill bit 20 can bore to as far as the prescribed depth Lm without, or less occurrence of, damage or crack of the hammered section (step 111).

As is clear from the above explanation, in this embodiment, automatic constant speed control is carried out by low rotation of the brushless motor 40 in accordance with set values (standard values) for the speed and the load current of the brushless motor 40 until a prescribed boring depth is reached or for a prescribed time. Damage to the work when starting operation is therefore prevented. In this embodiment, the determination of automatic constant speed control is carried out using a set value for motor speed and a set value for motor load current. The determinations can therefore be made accurately and in a straightforward manner.

It is also possible to put the soft start switching switch 67 off so as to release the soft starting and to carry out speed control manually by adjusting the extent of pulling of the switch trigger 61 when it is wished to perform boring or the like on a work of a hard material such as stone or concrete using a regular hammer drill function. It is also therefore possible to improve the efficiency with which a boring operation or the like is performed. It is also possible to automatically adopt a soft start release state in particular when "hammer mode" is selected using the switching member 8 by having the soft start switching switch 67 and the switching member 8 operate in unison. This means that operation of the soft start switching switch 67 can be omitted and operation efficiency can be substantially increased.

(Second Embodiment)

In the first embodiment, the control device 50 implemented low speed control based on detection of the speed N of the brushless motor 40 and the load current I of the brushless motor 40. However, in a second embodiment, low speed control is carried out by detecting vibration of the body of the hammer drill 1 rather than by detecting the speed N and the load current I. The following is an explanation with reference to the cross-sectional view of the essential parts of a hammer drill of FIG. 7 and the control flowchart of FIG. 8 of low speed control based on vibration detection.

Figure 7:
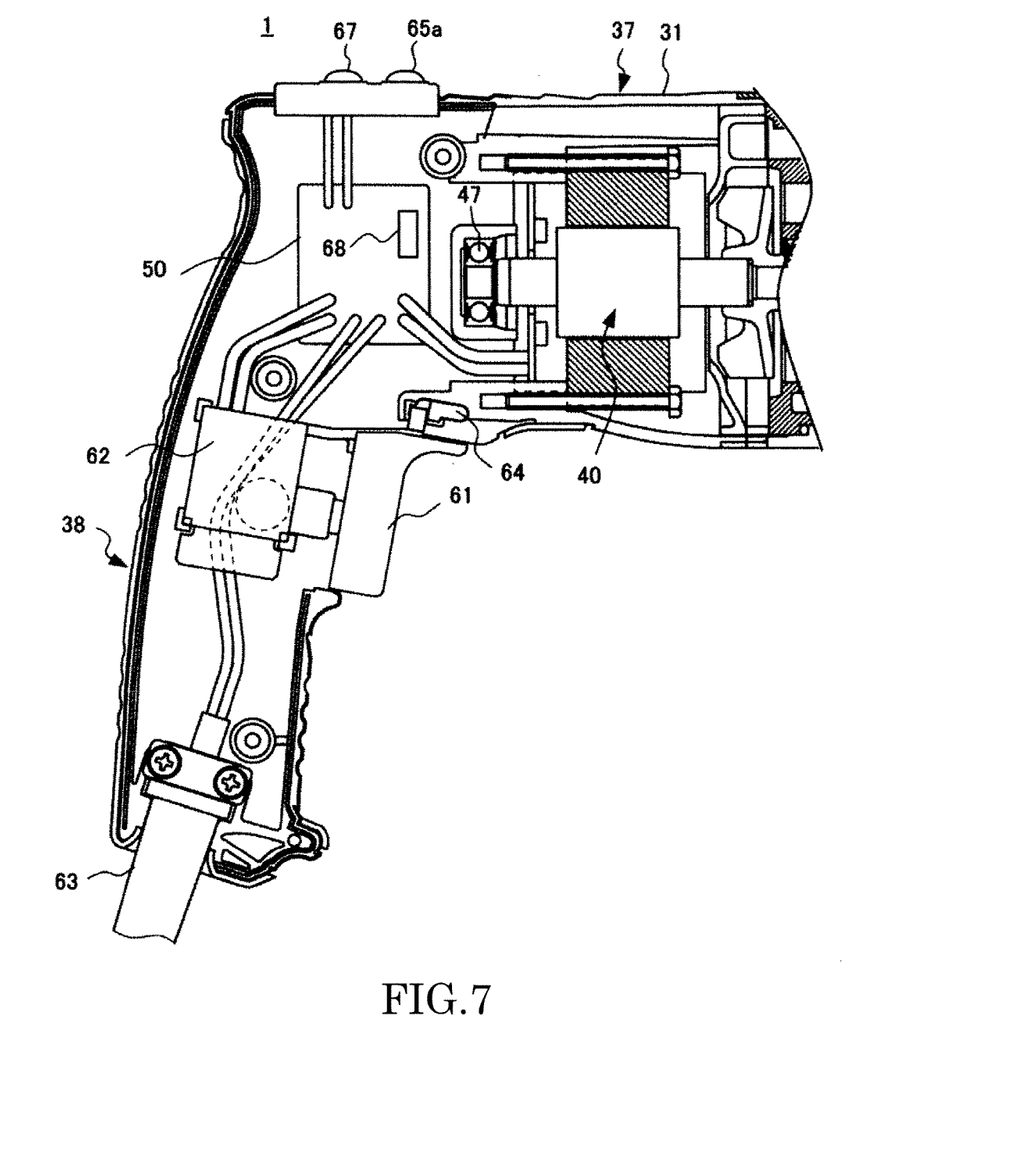
FIG. 7 is a cross-sectional view of the essential parts of an electric boring tool of a further embodiment.

As illustrated in FIG. 7, an acceleration sensor 68 functioning as an impact sensor is mounted at the control device (circuit substrate) 50 to the rear of the brushless motor 40 in order to detect vibrations of the hammer drill 1. An acceleration setting switch 65a for setting a threshold value (set value) detected by the acceleration sensor 68 is also provided.

Figure 8:
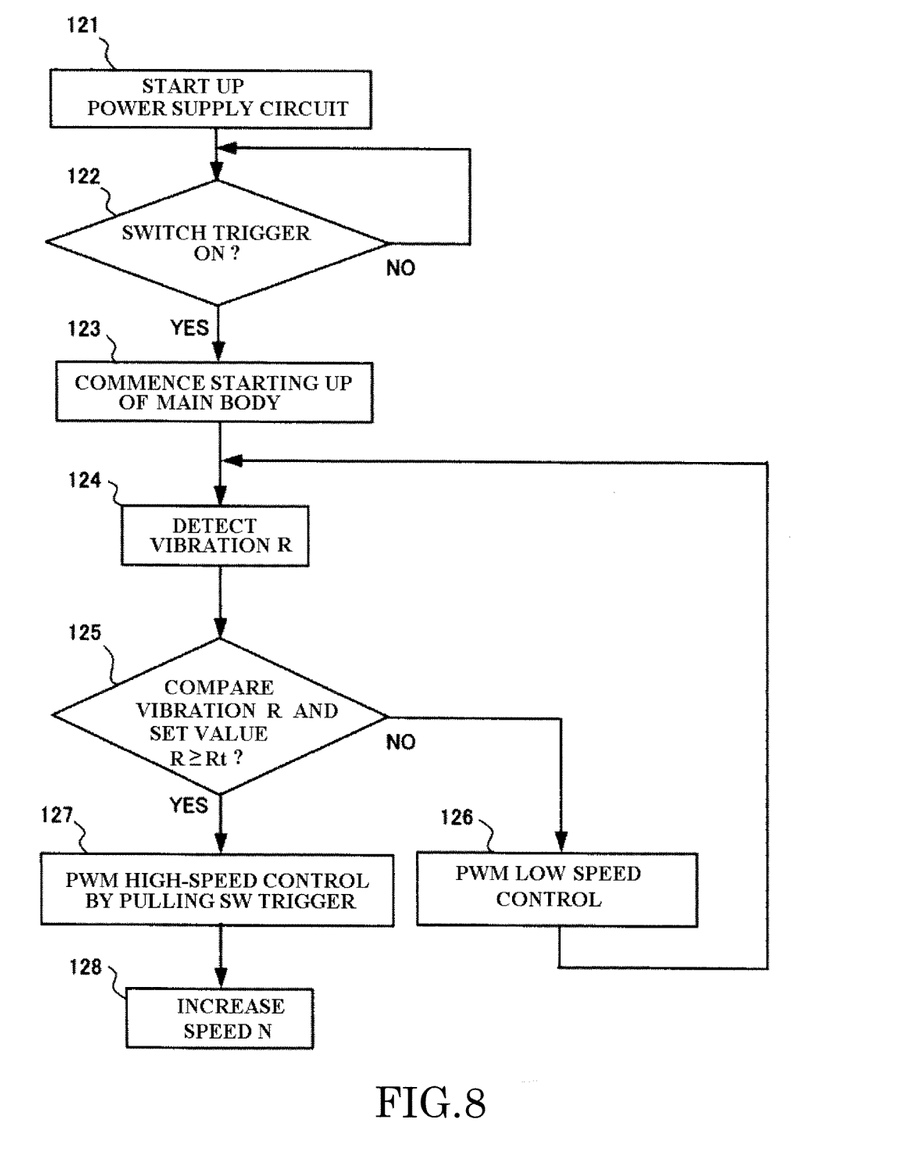
FIG. 8 a flowchart of control of the electric boring tool illustrated in FIG. 7.

First, a soft start switching switch 67 (refer to FIG. 7) is set to on and the power supply circuit is started up (step 121). Next, it is determined whether or not the switch trigger 61 is on (step 122) and the tool body is started up (step 123).

Vibration (acceleration) R is then detected by the operation unit 51 using the acceleration sensor 68 (step 124) and the operation unit 51 determines whether or not the vibration R has reached a prescribed value (set value) Rt (step 125). When the vibration R does not reach the set vibration (set value) Rt (step 125; No), the operation unit 51 subjects the pulse width duty ratio of the PWM drive signal for the control signal output circuit 57 for driving the inverter 59 to variable or fixed control (step 126), step 124 is returned to, and the vibration R is detected again.

When the vibration R is equal to or greater than the set value Rt in step 125 (step 125; YES), as illustrated in FIG. 6, the tip 20a of the drill bit 20 that is the tip tool is determined to have been buried in the section to be bored. When the operator pulls the switch trigger 61 firmly the operation unit 51 increases the duty ratio of the PWM drive signal of the control signal output circuit 57 (step 127). As a result, as illustrated in FIG. 5, the motor speed N is increased to the maximum speed Nm of the brushless motor 40 decided by the load torque, the motor load current I is increased to the maximum value Im, and as illustrated in FIG. 6, boring takes place to a prescribed depth Lm without damage or cracking to the bored section (step 128). Other explanations for the second embodiment is the same as those of the first embodiment. The explanation is therefore omitted.

(Modified Example of Second Embodiment)

Figure 9:
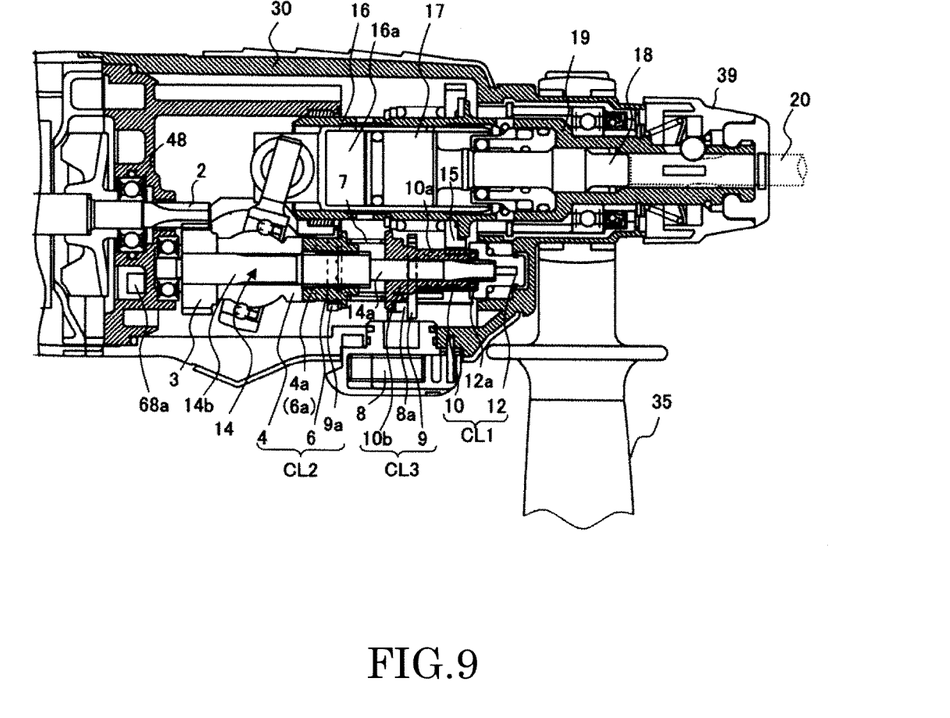
FIG. 9 is a cross-sectional view of the essential parts of an electric boring tool of a further embodiment.

It is possible to use a strain sensor utilizing the characteristics of change in pressure versus change in resistance of a semiconductor element or the like instead of using the acceleration sensor 68 for detecting vibration occurring in the second embodiment. An example illustrated in FIG. 9 illustrates an example where an electric boring tool detects stress (strain) occurring at the intermediate shaft 14 as a result of locating a strain sensor 68a in the vicinity of a bearing of the intermediate shaft 14 constituting the power transmission mechanism. Stress to be detected by the strain sensor may be any stress that occurs in a predetermined position in the power transmission mechanism. Stress occurring in the power transmission mechanism is detected by the strain sensor. It is therefore also possible to obtain the same results as for using the acceleration sensor when the strain sensor is used. Other explanations for the second embodiment is the same as those of the first embodiment. The explanation is therefore omitted.

In the embodiment 2 and its modifications, when the soft start switching switch 67 is in the off state, the control device 50 controls the speed of the brushless motor 40 from low speed rotation to high-speed rotation in response to an extent of pulling of the switch trigger regardless of the detection of vibrations or stress.

As is clear from the explanation of the embodiments (including modified example) above, according to the embodiments, when a boring operation is carried out by the electric boring tool, first, damage such as splitting and cracking is prevented from occurring at the entrance of the hole to be bored at the work by starting with the tip tool rotating at low speed when starting to work. After a hole is then made to a certain depth in the work by the tip tool, damage to the hole thereafter is prevented by exerting control so that the speed of the motor increases. Further, constant speed control is automatically carried out at a low rotational speed and control to increase the speed can be carried out voluntarily by pulling the switch trigger. It is therefore possible to improve the efficiency of the boring operation.

An explanation is given in the above embodiments of an electric boring tool using a three-phase brushless motor. However, application is also possible to electric boring tools using brushless motors other than three-phase brushless motors or using other electric motors. The present invention can also be applied to electric boring tools other than hammer drills, such as electric drills.

According to the embodiments above (in particular, the first embodiment), the control unit 50 (the motor control unit) automatically exerts control to give low speed rotation (low speed control) of the electric motor unless the load current of the electric motor reaches or exceeds set values after start of operation of the tip tool irrespective of the extent by which the switch trigger 61 is pulled. The control unit 50 (the motor control unit) exerts control to give high speed rotation (high-speed control) of the electric motor only when the load current of the electric motor reaches or exceeds the set values during the automatic low-speed control exerted on the electric motor. It is therefore possible to prevent or ease damage such as splitting and cracking due to drilling while making a hole in work (a workpiece) such as concrete or brick. In particular, it is possible to prevent damage to an entrance portion of a hole for a brittle material. The low speed control of the electric motor is exerted by comparison between the set values and the number of rotation or load current. Therefore, an appropriate low-speed control can be carried out by using set values for the low speed control of the electric motor, which are set suitably depending on the speed and load current of the motor to correspond to working conditions such as material of the work and bore diameter According to the embodiments above, it is possible to continue low speed control in a stable manner if the value set for the load current of the electric motor is made high when employing a hammer drill serving as the electric boring tool 1 having a "rotary-hammer mode" or a "hammer mode". As a result, it is possible to carry out a boring operation for work such as tiles that are easily damaged at low rotational speed.

According to the above embodiments (in particular, the second embodiment and its modifications), the control uni 50 (motor control unit) continues automatic control at low speed rotation unless vibration or stress occurring in the electric boring tool do not reach or exceed set values, irrespective of the extent by which the switch trigger is pulled. The control unit 50 (the motor control unit) exerts control to give high speed rotation (high-speed control) of the electric motor only when the load current of the electric motor reaches or exceeds the set values during the automatic low-speed control exerted on the electric motor. Therefore, the same results as for low speed control based on the speed and load current of the electric motor can therefore be obtained.

According to the above embodiments, the soft start switching switch 67 (soft release unit) for releasing automatic control of low speed rotation is also provided. Automatic control of low speed rotation can therefore be released and control in response to the extent of pulling of the switch trigger as with a regular hammer drill is also possible. As a result, it is possible to improve the efficiency of the operation of boring or the like of a work using the "hammer mode" for a hammer drill.

A detailed description is given by the applicants based on the embodiments of the invention but the present invention is by no means limited to the above embodiments and various modifications are possible within the essential scope of the present invention.

Having described and illustrated the principles of this application by reference to one (or more) preferred embodiment(s), it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application JP2009-021661, filed Feb. 2, 2009 the entire disclosure of which is incorporated by reference herein.

REFERENCE SIGNS LIST 1 electric boring tool
2 pinion output shaft
3 gear
4 motion conversion member
4a pawl section
6 sleeve
6a pawl section
7 first urging spring
8 switching member
8a projecting section
9 rotation engaging member
9a collar element
10 second pinion
10a pinion section
12 pinion sleeve
12a gear
14 intermediate shaft
14a front half (intermediate shaft)
14b rear half (intermediate shaft)
15 second gear
16 piston
16a air chamber
17 striker
18 intermediate element
19 cylinder
20 tip tool
30 gear casing
31 motor casing
35 side handle
37 body housing
38 handle housing
39 tip tool holding unit
40 brushless motor
41 stator
42 stator winding
43 rotor
44,45,46 rotation position detecting element
47,48 bearing
50 control device
51 operation unit
52 rotor position detection circuit
53 rotation angle detection circuit
54 current detection circuit
55 control unit
56 rotation direction setting circuit
57 control signal output circuit
58 converter
59 inverter
61 switch trigger
62 switch mechanism
62a applied voltage setting circuit
63 power supply cable
64 forward/reverse switching lever
65 load current setting circuit
65a acceleration setting switch
66 speed setting circuit
67 soft start switching switch
68 acceleration sensor
68a strain sensor
70 commercial AC power supply
90 work
90a work surface
Q1-Q6 MOSFET

The invention claimed is:

1. An electric boring tool comprising:
an electric motor;
a switch trigger;
a tip tool driven by driving force of the electric motor,
a power transmission mechanism for transmitting the driving force of the electric motor to the tip tool as rotational force and/or hammer force; and
a motor controller for controlling speed of the electric motor in response to an extent of pulling of the switch trigger,
wherein the motor controller subjects the electric motor to low speed control after the electric motor is started up even when the extent of pulling of the switch trigger is equal to or greater than a predetermined extent, the low speed control allowing the electric motor to rotate at a speed lower than a speed according to the predetermined extent, and controls the speed of the electric motor in response to the extent of pulling of the switch trigger when vibration or stress generated in the electric boring tool is a set value or greater during the low speed control.

2. The electric boring tool according to claim 1, wherein the motor controller comprises a setting unit capable of arbitrarily setting the set values for vibration and stress.

3. The electric boring tool according to claim 1, wherein the power transmission mechanism is a hammer drill mechanism having a switching mechanism for selecting one operation mode of at least a "rotary-hammer mode", or a "hammer mode" for transmission to the tip tool.

4. The electric boring tool according to claim 1, wherein the motor controller comprises a soft release unit for releasing the automatic control for the low speed rotation.

5. The electric boring tool according to claim 1, wherein the electric motor comprises a brushless motor and the motor controller controls the speed of the electric motor by pulse-width-modulating a voltage applied to the electric motor in response to the extent of pulling of the switch trigger.

6. An electric tool comprising:
an electric motor;
a switch trigger;
a power transmission mechanism for transmitting driving force of the electric motor to a tip tool;
a motor controller connected to the switch trigger, the motor controller being configured to activate the electric motor upon operation on the switch trigger and to control speed of the electric motor; and
a soft-start switching switch connected to the motor controller, wherein in response to a state of the soft-start switching switch, whether or not to perform soft-start control by the motor controller is switched, the soft-start control controlling the electric motor to rotate at a low speed until the motor controller determines that loading on the tip tool is equal to or greater than a specified degree,
after the electric motor is activated.

7. The electric tool according to claim 6, further comprising a current detector that detects current flowing through the electric motor, wherein the motor controller determines whether or not loading on the tip tool is equal to or greater than the specified degree, based on detection results of the current detector.

8. The electric tool according to claim 6, wherein, while the soft-start control is switched off or after the loading on the tip tool is determined to be equal to or greater than the specified degree during the soft-start control, the motor controller controls the speed of the electric motor in response to an extent of pulling of the switch trigger.

\* \* \* \* \*